Nov. 9, 1937.  J. G. HAWLEY  2,098,660
BRAKE
Filed Feb. 2, 1932  2 Sheets-Sheet 1
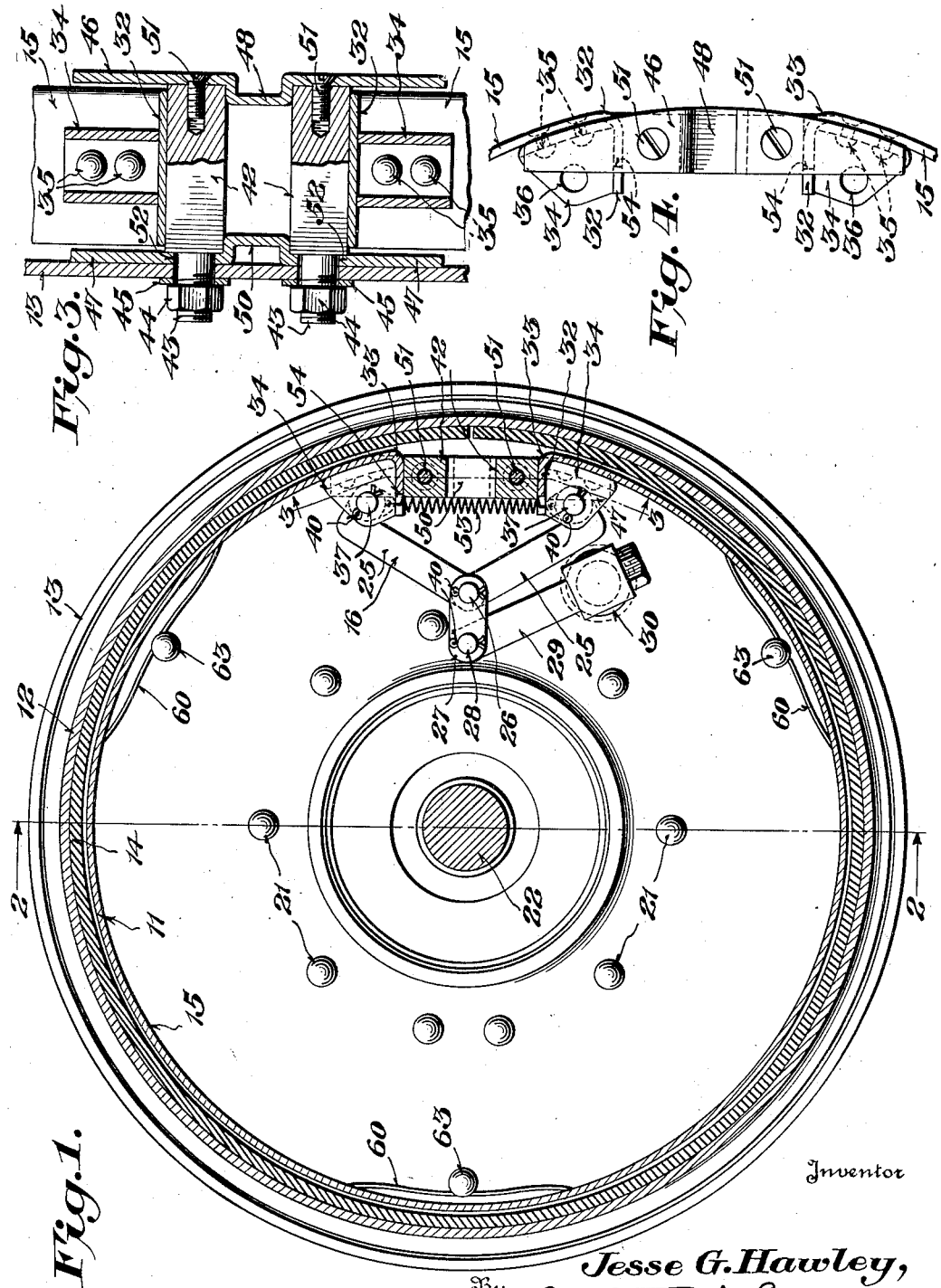

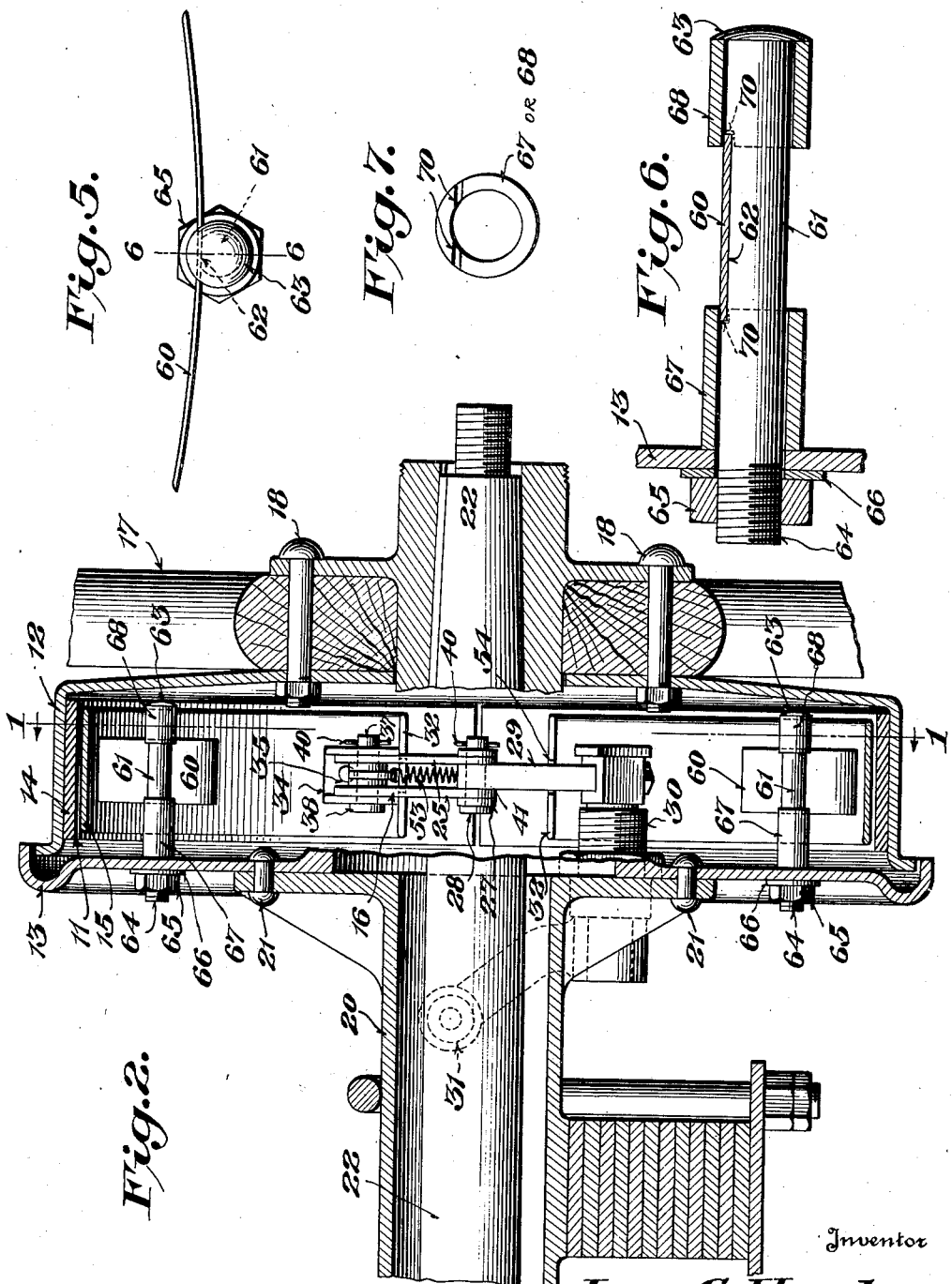

Patented Nov. 9, 1937

2,098,660

UNITED STATES PATENT OFFICE 2,098,660

BRAKE

Jesse G. Hawley, Painted Post, N. Y., assignor to Hawley-Jones Corporation, Riverside, N. Y., a corporation of New York Application February 2, 1932, Serial No. 590,481

5 Claims. (Cl. 188—78)

This invention relates to the art of brakes, and more particularly to internally expanding brakes.

Many attempts have been made to provide a thoroughly satisfactory brake but all of those with which I am familiar have been subject to certain disadvantages inherent in their construction, including overheating, improper centering of the brake sections, irregular wear, and slow release.

I have discovered that all of the above disadvantages can be overcome and more smooth and velvety application of the brake secured by providing the brake with a full floating brake shoe, and with a creeping brake lining instead of a fixed brake lining.

It is therefore an object of this invention to provide a new and improved brake.

It is another object to provide a brake with a full floating brake shoe.

It is a further object to provide a brake with a creeping brake lining.

It is a still further object to provide a mechanical brake which is operated thru a toggle mechanism, and is provided with a full floating brake shoe and a creeping brake lining.

It is also an object to provide a brake whose members are self-centering.

It is another object to provide a brake with tension applying means which prevent rattling an insure uniform pressure against the entire area of the brake shoe.

It is still another object to provide a brake with means for securing a quick release from the braking action after the latter has served its purpose.

With the above and other objects in view, which will be apparent as the description proceeds, I have set forth my invention in the following specification and have illustrated it in the accompanying drawings, in which:

Figure 1 is a vertical longitudinal section thru my improved brake on the line 1—1 of Fig. 2.

Fig. 2 is a vertical, transverse section thru my brake on the line 2—2 of Fig. 1, with certain parts removed for the sake of clearness.

Fig. 3 is a transverse sectional detail on the line 3—3 of Fig. 1 illustrating my preferred means for preventing rotation of the brake shoe.

Fig. 4 is a plan view of Fig. 3.

Fig. 5 is a plan view of one of my assembled silencers.

Fig. 6 is a vertical section on the line 6—6 of Fig. 5 but also showing a portion of the cover section of the brake drum, and Fig. 7 is a plan view of one of my spacing sleeves.

Referring to the accompanying drawings, and particularly to Figs. 1 and 2, my brake 11 preferably comprises a drum 12, a fixed brake cover 13, a creeping brake lining 14, a full floating brake shoe 15, and a toggle 16 for forcing the brake shoe into contact with the brake lining when the brake is to be applied and for withdrawing it therefrom immediately upon releasing the brake.

The drum 12 is secured to a wheel 17 by bolts 18, and the brake cover 13 is secured to an axle housing 20 by rivets 21 in the usual way.

In Fig. 2 I have shown my brake applied to the right rear wheel of a vehicle with the rear axle 22 loosely mounted in the axle housing 20 and extending thru the wheel 17. The latter is supported in the conventional way by a bearing (not shown) carried by the axle housing 20. The wheel 17 and attached brake drum 12 are free to turn with respect to the fixed brake cover 13.

The toggle 16 preferably comprises two pairs of toggle links 25, whose outer ends are pivotally connected to the ends of brake shoe 15, and whose inner ends are mounted on a pin 26. The latter is connected by a pair of operating links 27 with a pin 28, to which is pivoted the inner end of a crank 29 that is carried in a bearing 30, in brake cover 13, and passes thru the latter to the outside of the brake for engagement with the brake rod connections 31.

As indicated in the drawings, my toggle is of special shape and design so it will flatten and have its full limits of action inside the fixed stops hereinafter described. Furthermore, my compound toggle action, accomplished thru crank 29, operating links 27 and toggle links 25, is believed to be an important factor in the velvety action of my brake.

My floating brake shoe 15 preferably comprises a single flexible band with spaced inturned ends 32 that present rounded corners 33 to the brake lining 14. U-shaped bearings 34 are secured to the inner sides of the ends of the brake shoe in any suitable manner, as by rivets 35, and these bearings are perforated at 36 to receive pivot pins 37 to which the outer ends of the toggle links 25 are connected.

The various pivot pins 26, 28 and 37 are of any suitable type but may conveniently be headed at one end, as at 38, and perforated at the opposite end to receive a cottor pin 40. Suitable spacing washers 41 are provided for the various pins 26, 28 and 37.

To prevent the brake shoe 15 from turning with the brake drum, I provide a pair of fixed stops 42, preferably arranged inside of the line of the periphery of the brake shoe 15 when the latter is in its contracted position. These stops preferably comprise rods that are provided with threaded ends 43 to enable the stops to be secured to the brake cover 13 by nuts 44 and washers 45. To conveniently insure the perpendicular positioning of the stops with respect to the plane of the brake cover 13, I provide spacing plates 46, 47, which have similar raised portions 48, 50, that are equal in width to the desired space between the stops. Spacing plate 46 is secured to the stops in any convenient way, as by machine screws 51, and spacing plate 47 is apertured at 52 to enable it to be telescoped over the threaded ends of the stops and held against the flat portions thereof by the nuts 44 and washers 45.

A coil spring 53 is attached to the central washers 41 carried by the pivot pins 37 and passes thru slots 54, provided in the inturned ends 32 of the brake shoe 15, to normally hold these ends against the stops 42.

To limit the contraction of my floating brake shoe 15, and to maintain it in proximity to the brake lining 14 and drum 12, and at the same time to prevent it from rattling, I provide silencers as shown in detail in Figures 5 and 6. These silencers preferably comprise spring plates 60 which are slightly curved sheets of spring steel that are maintained in compressed relation to the brake shoe 15 by retaining bolts 61, each of which has on one side a flattened portion 62 equal in width to the spring plate 60. Each bolt is provided with a head 63 and a threaded portion 64 at its opposite end for engagement with a nut 65 and washer 66 by means of which it is secured to the brake cover 13. I also prefer to provide spacing sleeves 67 and 68 which are each provided with a slot 70 at one end to receive the spring plate. These spring plates, bolts and spacers are assembled, as shown in Fig. 6, in such a manner that the spacers securely hold the spring plate in a predetermined position, and the bolts are so mounted with respect to the brake band 15 that the spring plates are under compression and maintain a normal outward thrust on the brake shoe.

When it is desired to apply the brake, the operator actuates the brake rod connections 31, which rock the crank 29 in its bearing 30 and, thru operating links 27, force the toggle links 25 outwardly, thereby causing the brake shoe 15 to exert a uniform pressure thruout its circumference against the brake lining 14 and press the latter against the inner surface of the drum 12.

When the brake is applied while the drum is rotating in a clockwise direction, taking Figure 1 for illustration, the right inturned end 32 of shoe 15 pulls away from the right stop 42, and the left inturned end 32 pushes or slides up until contact is made with the lining.

When the operator releases the brake a reverse movement is imparted to the toggle which withdraws the ends 32 of the brake shoe, and hence withdraws the entire brake shoe from contact with the brake lining 14.

This entire shoe, being made of resilient material and only being anchored by pushed contact against the stops 42, has a tendency when released to disengage its entire surface from the brake lining because of the above characteristics and its free floating nature. In other words, when pressure upon the toggle is released, there is nothing to maintain engagement or braking action as the whole shoe simply contracts.

Furthermore, since the brake shoe is preferably a single floating member and the brake lining is not secured to it, the characteristic clinging action of previous brakes is avoided and a quick positive release is secured. This eliminates the pronounced chattering of previous brakes when they are applied lightly, and the grabbing when they are applied quickly or savagely, and produces a smooth velvety braking action.

It is a special point of my invention to provide a full floating brake shoe 15 which is secured only where it is pivoted at 37 to the toggle links 25, although it is prevented from having any substantial rotation by the stops 42. By being mounted in this manner the floating brake shoe will correct any slight off center relation between the brake drum and the axle and prevent the characteristic ridging of the interior of the brake drum, which is the usual, if not universal, accompaniment of the use of a fixed brake shoe.

It is also a special feature of my invention to provide a brake with a creeping brake lining 14 which is free to creep or float in the space between the brake shoe 15 and the flange of the drum 12 during the periods between applications of the brake and while the brake is being applied or released. By providing a creeping brake lining, I avoid the overheating and the tendency to secure braking with the same zone of the brake lining at all times which are inherent in a brake having a fixed brake lining.

Another special feature of my invention is the provision of a brake shoe with inturned ends that are connected with the body portion of the shoe by rounded corners 33. The latter prevent gouging the brake lining by sliding over it, and also overcome any tendency of a creeping brake lining to leave the contour of the drum and curl into the space between the ends of the flexible shoe. The inturned ends 32 also provide convenient stop engaging members to prevent the flexible shoe 15 from turning with the wheel 17.

The creeping brake lining 14 is of any suitable type, such as the usual asbestos brake lining.

From the above discussion it will be apparent that I have provided a new and improved brake which can be manufactured largely by stamping processes, and is simple in construction and efficient in operation. Although I prefer to make the brake shoe 15 out of spring steel, other flexible steels or cast iron may be used. When cast iron is used it will of course be thicker and heavier than spring steel, e. g., ¼ inch instead of ⅛ inch in thickness. Similarly, the brake drum 12 may be of pressed steel or cast iron. The toggle links and operating links may be varied in construction and single members may be used instead of duplicate members. Where a plurality of brake shoes are desired the number of toggles will be correspondingly increased. Likewise, the preferred stop construction and silencers may also be varied within the scope of the appended claims.

It will also be apparent that by means of my floating brake shoe 15, I am able to correct the almost inevitable eccentricity of the mounting of the brake shoe with respect to the brake drum and to secure a quick release of the brake, and that, by virtue of the creeping brake lining, I not only eliminate the difficulty of originally installing as well as of replacing brake linings, but the wear resulting from the application of the brake is distributed over the entire area of the brake lining instead of being limited to certain portions thereof, and that this also accomplishes the highly valuable adjunct of eliminating overheating.

Although I have herein disclosed a toggle operated brake, it will be apparent that the toggle mechanism can be replaced by hydraulic or cam operated mechanisms, and I therefore desire to claim broadly the features of a brake having a full floating brake shoe and/or a creeping brake lining, as well as the various features of construction specifically disclosed herein.

As many apparently widely different embodiments of this invention may be made without departing from the spirit thereof, it is to be understood that I do not limit myself to the foregoing embodiments or description except as indicated in the following patent claims.

I claim:

1. In a brake, the combination of a brake cover, a drum relatively movable with respect thereto, a creeping brake lining for engagement with the drum, a flexible brake shoe for cooperation with the brake lining, a toggle member for expanding said brake shoe against said brake lining, and means which at all times exert an outward thrust on portions of the brake shoe remote from its ends.

2. In a brake, the combination of a brake cover, a drum relatively movable with respect thereto, a creeping brake lining for engagement with the drum, a flexible brake shoe for cooperation with the brake lining, a toggle member for expanding said brake shoe against said brake lining, and a plurality of spring plates which at all times exert an outward thrust on portions of the brake shoe remote from its ends.

3. In a brake, the combination of a body member, a drum relatively movable with respect thereto, an unstiffened creeping brake lining for engagement with the drum, and a brake shoe for cooperation with the brake lining, said brake shoe having inturned ends exposing rounded corners at the portion of the ends closest to the brake lining.

4. In a brake, the combination of a body member, a drum relatively movable with respect thereto, an unstiffened creeping brake lining for engagement with the drum, and a full floating single flexible brake shoe for cooperation with the brake lining, said brake shoe having inturned ends exposing rounded corners at the portion of the ends closest to the brake lining.

5. In a brake, the combination of a body member, a drum relatively movable with respect thereto, an unstiffened creeping discontinuous brake lining for engagement with the drum, a full floating flexible brake shoe having spaced ends for cooperation with the brake lining, and means for preventing the ends of the brake shoe from gouging the brake lining.

JESSE G. HAWLEY.